United States Patent [19]

Schurr

[11] Patent Number: 5,183,125

[45] Date of Patent: Feb. 2, 1993

[54] LOAD-SENSING ELEMENT FOR A BALANCE

[75] Inventor: Michael Schurr, Murrhardt, Fed. Rep. of Germany

[73] Assignee: Soehnle-Waagen GmbH & Co., Murrhardt, Fed. Rep. of Germany

[21] Appl. No.: 499,517

[22] PCT Filed: Jan. 19, 1989

[86] PCT No.: PCT/EP89/00057
§ 371 Date: Jul. 11, 1990
§ 102(e) Date: Jul. 11, 1990

[87] PCT Pub. No.: WO89/07245
PCT Pub. Date: Aug. 10, 1989

[30] Foreign Application Priority Data

Jan. 19, 1989 [DE] Fed. Rep. of Germany ....... 3802153

[51] Int. Cl.⁵ .................... G01G 3/14; G01G 3/08; G01L 1/22
[52] U.S. Cl. .................... 177/211; 177/229; 73/862.627
[58] Field of Search ............... 177/229, 211; 73/862.65

[56] References Cited

U.S. PATENT DOCUMENTS

| | | | |
|---|---|---|---|
| 4,022,288 | 5/1977 | Canevari | 177/229 |
| 4,505,345 | 3/1985 | Jetter | 177/229 X |
| 4,593,778 | 6/1986 | Konishi et al. | 177/229 X |
| 4,678,050 | 7/1987 | Wirth et al. | 177/229 |
| 4,718,287 | 1/1988 | Mishliborsky | 177/229 X |
| 4,892,163 | 1/1990 | Aumard | 177/211 |

Primary Examiner—George H. Miller, Jr.
Attorney, Agent, or Firm—Jones, Tullar & Cooper

[57] ABSTRACT

A load-sensing element for a balance comprises a beam which receives the load at one end, with a horizontal recess. The bending points of two guide rods formed by sections of substantially reduced material cross-section on the upper and lower faces of said recess provide a parallel guide. The measurement signal is derived by means of two wire strain gauges at the bending points on the upper face. The lower guide rod has a shoulder between the bending points at which the external cross-section of the beam widens. As a result, the centrelines of the material cross-section of the bending points formed by this guide rod are mutually offset by a certain distance. In an alternative to the formation of the shoulder, wire strain gauges are provided at the bending points on the upper surface of the upper beam and on the lower surface of the lower beam.

7 Claims, 4 Drawing Sheets

LOAD-SENSING ELEMENT FOR A BALANCE

BACKGROUND OF THE INVENTION

1. Technical Field

The present invention relates to a load-sensing element for a balance, and in particular to a load-sensing element for a balance embodied by a beam that receives a load on one end. The balance has a horizontal recess with substantially reduced, identical cross sections of material on the top and bottom of the recess which form bending points, in such a manner as to make two guide bars of a parallel guide between the bending points, and in which a measurement signal is derived by wire strain gauges on the bending points.

2. Prior Art

A load-sensing element of this type is known from European Patent Document 0 227 850. It is disadvantageous that the bending points of one guide bar are unequally strained, because the bending moment of the entire beam is superimposed on the bending moments of the individual guide bars. To compensate for this, it is known to embody the material cross sections at the bending points differently (European Patent Document 0 207 240). It is also known to improve the linearity of such a load-sensing element by the special disposition of a connecting rod between one guide bar and a measurement cell (German Published, Unexamined Patent Application DE-OS 32 39 002).

A disadvantage of the known load-sensing elements is that when there is a large new load, the resultant measurement signal varies sharply if the engagement point of the load longitudinally of the beam changes even slightly—in a range of as little as 1/10 of a millimeter—as can happen from wear, for example.

SUMMARY OF THE INVENTION

It is the object of the present invention to improve a load-sensing element of the above-described type such that its sensitivity to variations in the load engagement point is decreased or eliminated.

According to the present invention, this object is attained by disposing wire strain gauges on the bending points of one guide bar; the other guide bar has a shoulder between the bending points, at which shoulder the outer cross section of the beam increases, and the center lines in the material cross section of the bending points forming this guide bar are offset from one another by a predetermined amount.

As a consequence of the shoulder, the offset in the center lines of the material cross section at the bending points increases the outer cross section of the beam or beams, which increases the outer cross section of the beam, on the precondition that at the bending points, the distances between the outer faces of the beams and the opening must be equal. When a load is imposed, the offset creates an additional torque, which strains the bending points with an additional bending moment. This can be determined, by suitable dimensioning, such that a certain deflection of the engagement point of the load on the beam no longer leads to any perceptible change in the derived measurement signal.

A further provision of the present invention is that the load-sensing element is embodied by three beams which are joined together in the shape of an E by a transverse beam, and that the fastening of the load-sensing element on a bracket is effected at the free ends of the two outer beams, and the load is received on the free end of the middle beam. This has the advantage, when each of the beams is embodied by two guide bars, forming a parallel guide, that the force plane of an exerted load always remains the same, even if the loaded middle beam deflects. Linearity is improved considerably thereby.

BRIEF DESCRIPTION OF THE DRAWINGS

An exemplary embodiment of the invention and its advantageous further features will now be described in detail, referring to the accompanying drawings. Shown are.

DETAILED DESCRIPTION OF THE PREFERRED EMBODIMENTS

Figure 1:
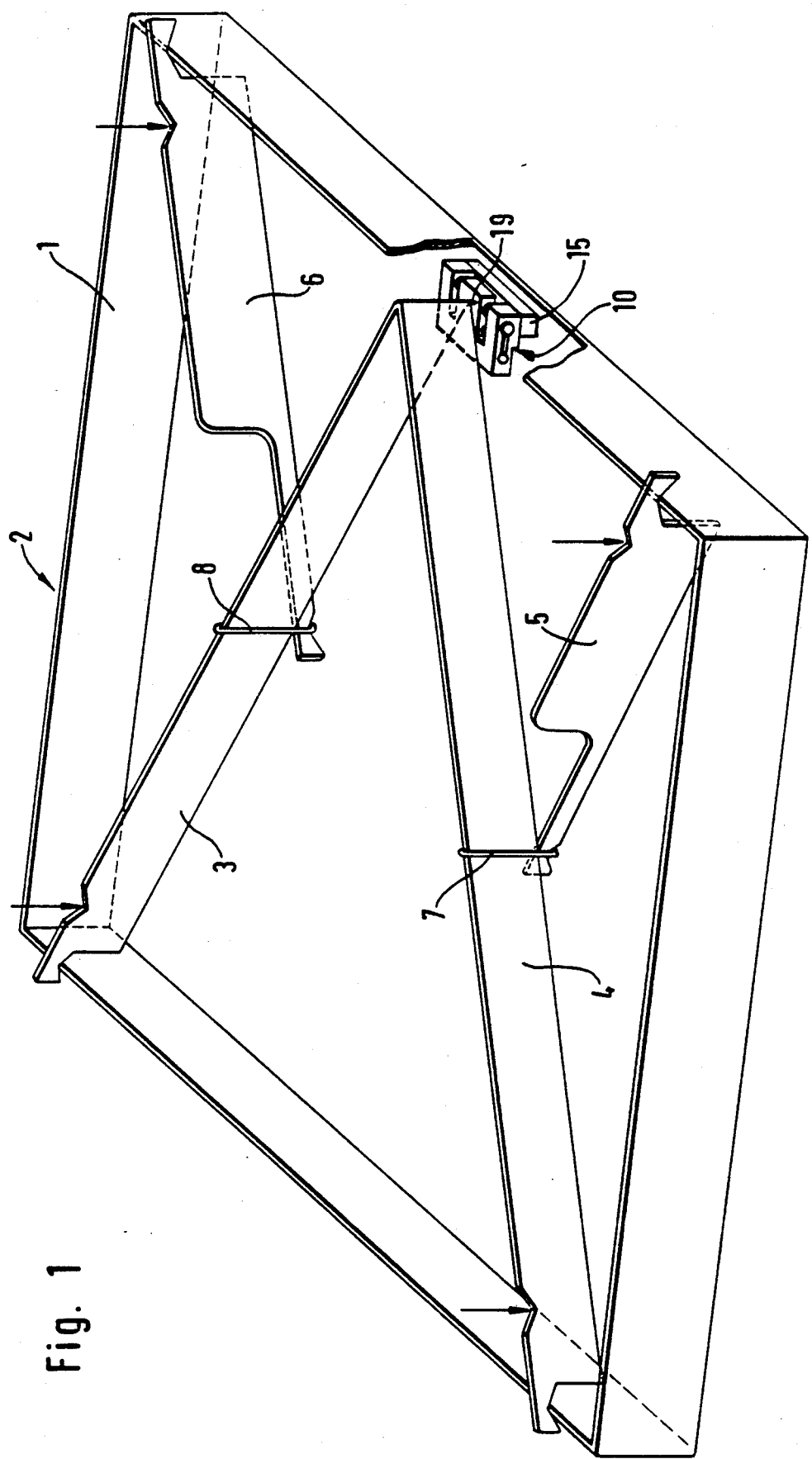
FIG. 1, which is a schematic layout of a balance with a load-sensing cell according to the present invention.

FIG. 1 schematically shows the structure of a balance. Four levers 3, 4, 5, 6 are suspended from the rim 1 of a box 2; via respective hangers 7, 8. The levers 5 and 6 engage the levers 3 and 4 approximately in the middle. The levers 3, 4 are joined together at their free ends, where they support a stylus 19 that acts upon the load-sensing element 10. The levers 3–6 are loaded in turn at the points indicated by arrows from a board (not shown), via a balance blade and block.

Figure 2:
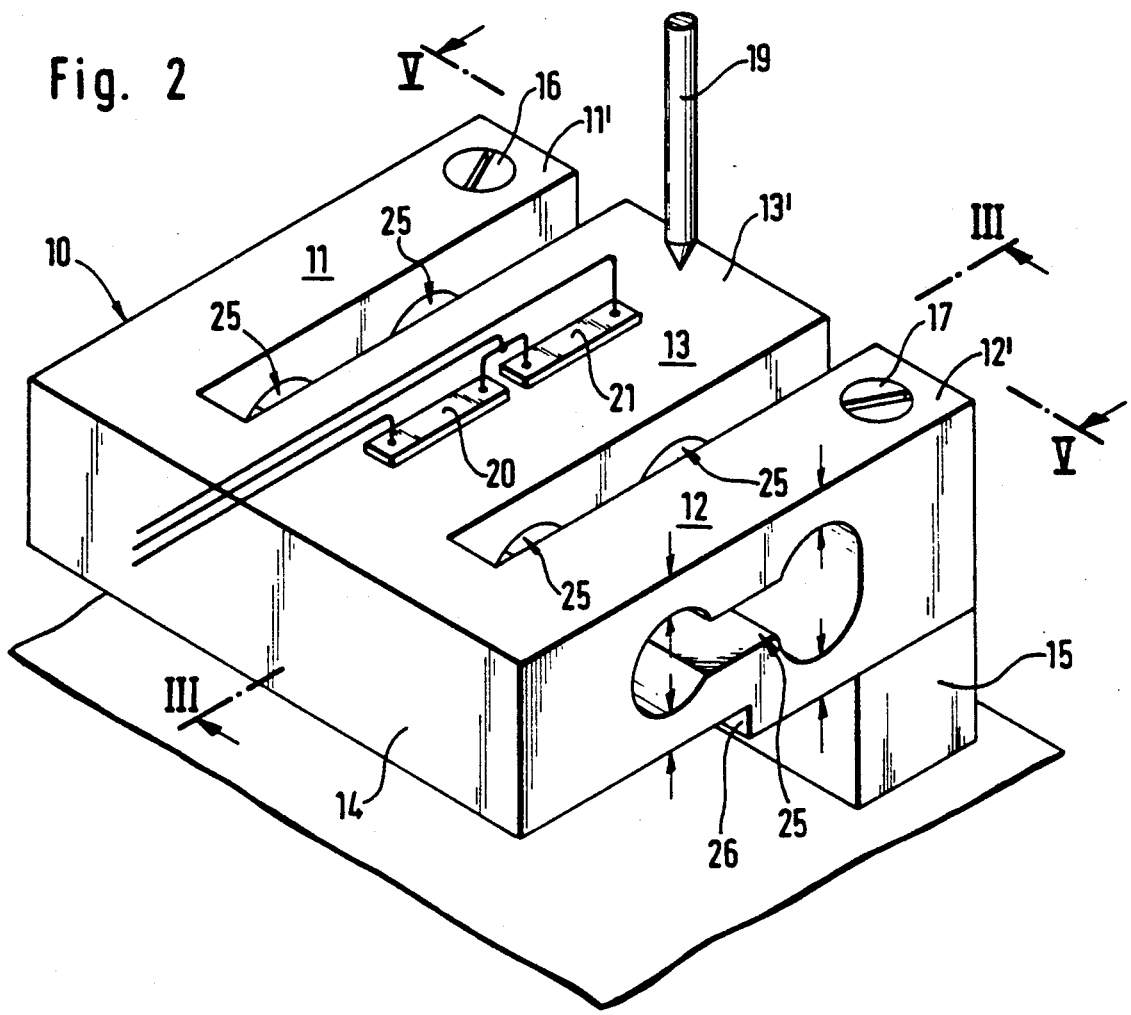
FIG. 2, which is a perspective view of the load-sensing cell.

FIG. 2 shows the load-sensing element 10. It is embodied by two outer beams 11, 12 and one inner beam 13, which are disposed parallel to one another, are of equal length, and are joined together via a transverse beam 14 extending at right angles to them. The shape in plan view is that of an E. The two outer beams 11, 12 are fastened by their ends 11', 12' to a bracket 15 by means of screws 16 and 17, respectively. The load-sensing element 10 receives the load by means of the stylus 19, which is connected to the levers 3 and 4 where they are joined at the front.

Figure 3:
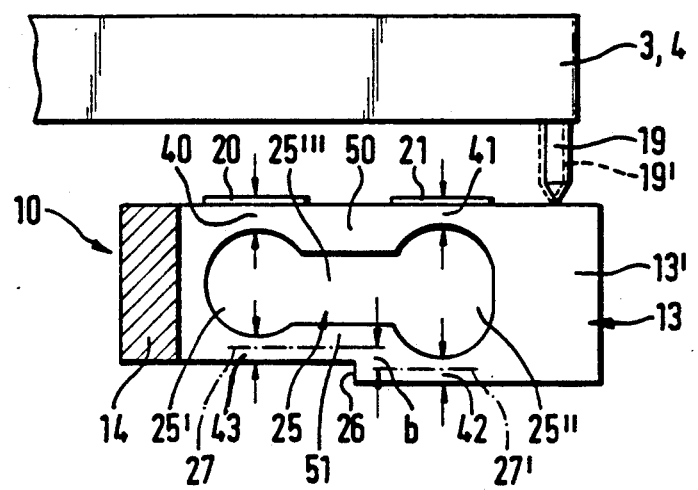
FIG. 3, which is a section taken along the line III—III in FIG. 2.

As FIG. 3 shows, the beams 11, 12, 13 are each provided with an opening 25, which is substantially formed by the circular region 25' and the oval region 25", which communicate with one another via a region 25"' of rectangular cross section. The regions 25' and 25" have equal radii. Accordingly, by means of substantially reduced material cross sections, bending points 40, 41, 42, 43 are created. The material cross sections of the bending points 40–43 are all the same, as indicated by the arrows. Between these bending points, guide bars 50, 51 of a parallel guide are formed.

Upon deformation under load, compression zones and tension zones form at the bending points 40, 41, 42, 43 in the guide bars 50, 51 in each beam. Two wire strain gauges 20, 21 are disposed on the bending points 40, 41 on the top of the guide bar 50, specifically the wire strain gauge 20 in a tension zone and the wire strain gauge 21 in a compression zone. Along with additional resistors, the two wire strain gauges are wired as a Wheatstone bridge, which is balanced in the unloaded state, and in which, if there is an imbalance caused by loading, the measurement signals generated in the wire strain gauges are added together.

In use, the engagement points of the stylus 19 on the right-hand end 13' of the beam 13 can shift, as indicated in FIG. 3 in dashed lines at 19'. Such a shift on the order of as little as 1/10 of a millimeter can easily result from wear. As a result, when only two wire strain gauges 20 and 21 are disposed on the top of the guide bar 50 of the beam 13, a change in the measurement signal derived from them ensues. These variations in the wire strain gauges 20 and 21 are asymmetrical; that is, upon a deflection, the signal variations are not identical in amount.

To overcome this problem, in the exemplary embodiment of FIGS. 1-5 a shoulder 26 is provided on the underside of one guide bar 51; this increases the outer cross section of the beam, such that the end 13' on which the load is exerted by means of the stylus 19 has the larger cross section. As a result, the center lines 27, 27' of the material cross sections on the bending points 42-43 are offset from one another by the amount b. The beams 11 and 12 are embodied accordingly. Since the two center lines 27, 27' are offset from one another by the amount b, the compression-loaded lower guide bar 51 is deflected somewhat. As a result, the lower bending points 42, 43 are loaded with an additional bending moment. By skilled selection of the offset b, it can be attained that a certain deflection of the engagement point of the tip of the stylus 19 in the longitudinal direction of the beam no longer produces any perceptible variation in the measurement signal.

Figure 4:
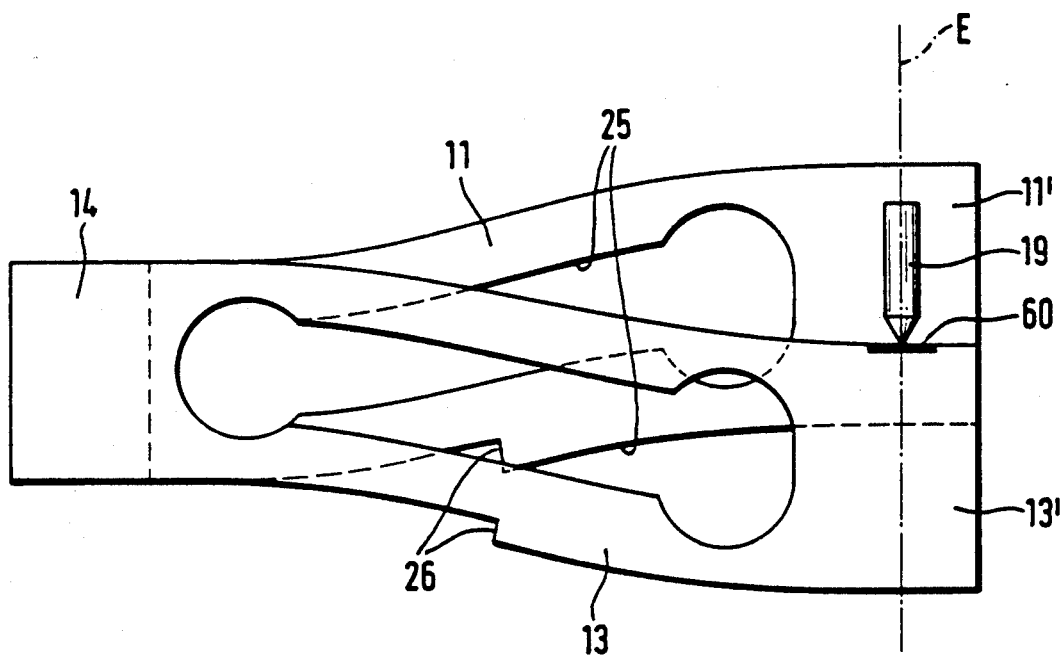
FIG. 4, which is a view of the bending of two beams of the load-sensing element under load.

As seen in FIG. 4, this embodiment of the various beams, combined with the E-shaped embodiment of the three beams 11, 12, 13, has yet another advantage: The plane E in which the stylus 19 is located does not vary upon deflection of the middle or center beam 13, which is the one that receives the load. This considerably improves the linearity of the measurement signal derived. Furthermore, with the E-shaped embodiment combined with the embodiment of the various beams as 2-bar parallel guides, the region 60 under the tip 19, which is shown in somewhat heavier lines, will always be exactly horizontal.

Compared with known balance cells, embodied by only one beam, with force induction on one end and the fastening effected on the other end, the E-shaped rotary beam arrangement of FIG. 2 results in a dual measurement path, because the outer two beams 11, 12 together have the same width as the middle beam 13, so that upon load they deflect precisely as much as the middle beam. A low structural height is also attained, along with the fact that the force induction and the fastening are located near one another.

Figure 5:
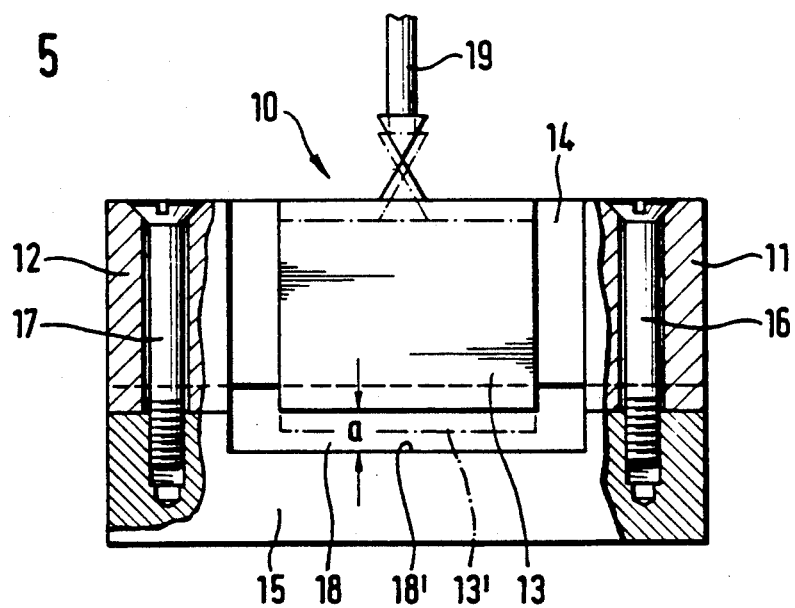
FIG. 5, which is a view of the exemplary embodiment of FIG. 2 in the direction of the arrows V—V.

FIG. 5 shows an overhead protection, attained by disposing the two outer beams 11, 12 on the bracket 15 that has a recess 18 inside the inner beam 13, with the upper face 18' of the recess being indented far enough that the center beam 13 can deflect to the desired extend and at a defined load, corresponding to a defined deflection, will meet the upper face 18'. The symbol a indicates the depth of the indentation in the recess 18 in the center beam 13.

Figure 6:
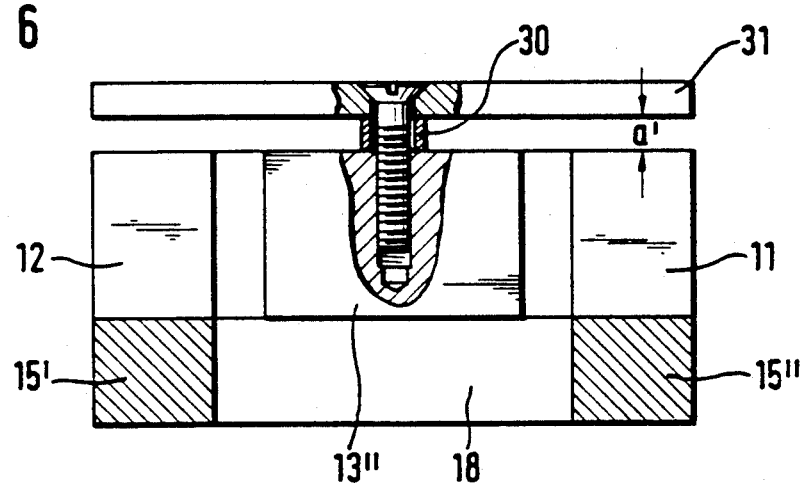
FIG. 6, which is a modified exemplary embodiment in a view corresponding to FIG. 5.

A modification, with a somewhat different embodiment of the overload stop, is shown in FIG. 6. Here the overload stop is embodied by a stop plate 31, which by means of the spacer sleeve 30 is disposed on the center beam 13 at a certain distance a' from the top of the center beam 13 and laterally overlaps the outer beams 11, 12. Upon being loaded by a predetermined load, at which the overload stop is supposed to be reached, the two outer ends rest on the outer beams 11, 12 and thus prevent a deflection.

Figure 7:
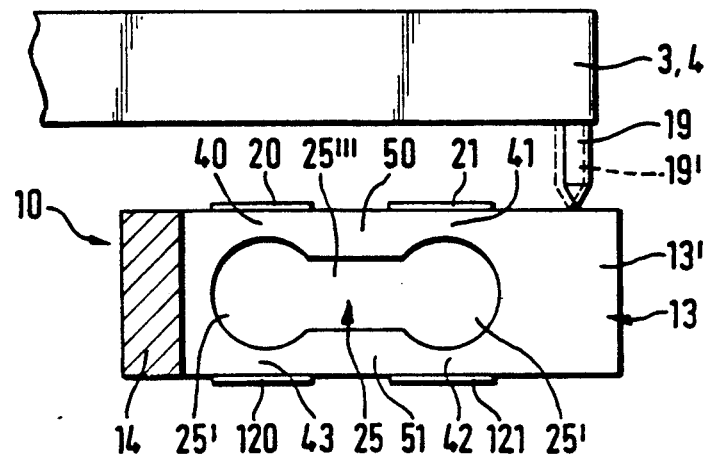
FIG. 7, which is a further exemplary embodiment.

FIG. 7 shows a second way of attaining the object of the present invention. In the exemplary embodiment of FIG. 7, the shoulder 26 on the underside of the lower guide bar 51 is dispensed with. Instead, wire strain gauges 120 and 121 are disposed on the underside as well. They can then be wired together with the two upper wire strain gauges 20, 21 in the form of a bridge, in such a way that the resultant asymmetries in the variations of the measurement signal in the wire strain gauges 20, 21 caused by the shift in the engagement point 19 of the load—as caused by wear, for instance—are compensated for by corresponding variations in the wire strain gauges 120, 121.

In this embodiment, the recess 25 is made symmetrical; that is, it comprises two circular recesses 25' of equal size, with a rectangular recess 25" between them. In this embodiment as well, the entire block can be embodied in the shape of an E, as shown in FIG. 2. It is more favorable, however, to select the exemplary embodiment of FIGS. 1-5 (including the modification of FIG. 6), because embodying the entire E-shaped block from an extruded profile, with the shoulder 26, is much easier and simpler than using two additional wire strain gauges.

The overall result of the present invention, including its advantageous improvements, is a load-sensing cell having optimal properties. The cell can be designed to be usable even for such small loads as 1 or 2 kg.

What is claimed is:

1. A load-sensing element for a balance, comprising: at least one beam that receives a load at one end; and at least two strain gauges, said beam including a horizontal opening defining reduced cross sectional areas of the beam on the top and bottom of the opening forming bending points connected by material forming a guide bar at the top of the opening and a guide bar at the bottom of the opening, the guide bar at the top of the opening being parallel to the guide bar at the bottom of the opening, wherein:

a strain gauge is disposed at each bending point associated with one of the guide bars, the strain gauges generating a measurement signal as a function of the load;

the other guide bar having a shoulder situated between its associated bending points, at which shoulder the cross section of the beam increases; and the bending points associated with said other guide bar each defining a center line which are offset from one another by a predetermined amount.

2. The load-sensing element as defined in claim 1, having three beams, and further comprising:

a transverse beam; and a bracket, and wherein:

said three beams are joined together in the shape of an E by the transverse beam;

each beam connected to the transverse beam includes a horizontal opening defining reduced cross sectional areas of their respective beam on the top and bottom of the opening forming bending points connected by material forming a guide bar at the top of the opening and a guide bar at the bottom of the opening, the guide bar at the top of the opening being parallel to the guide bar at the bottom of the opening;

the center beam receives the load and has a strain gauge disposed at each bending point associated with one of its guide bars;

a strain gauge is disposed at each bending point associated with each guide bar of the center beam of the three connected beams, the strain gauges generating a measurement signal as a function of the load received by the center beam; and the outer beams of the connected beams being connected to said bracket.

3. The load-sensing element as defined in claim 2, wherein:

said bracket defines a recess which extends beneath the center beam, the depth of said recess being sufficient that it serves as an overload stop for the center beam.

4. The load-sensing element as defined in claim 2, further comprising:

a plate disposed on said center beam at a given distance from the top thereof which laterally overlaps the outer beams, said plate forming a stop plate serving as an overload stop.

5. A load-sensing element for a balance, comprising: three beams joined together in the shape of an E by a transverse beam; at least four strain gauges; and a bracket, each joined beam including a horizontal opening defining reduced cross sectional areas of their respective beams on the top and bottom of the opening forming bending points connected by material forming a guide bar at the top of the opening and a guide at the bottom of the opening, the guide bar at the top of the opening being parallel to the guide bar at the bottom of the opening, wherein: p1 a strain gauge is disposed at each bending point associated with each guide bar of the center beam of the three connected beams, the strain gauges generating a measurement signal as a function of the load received by the center beam; and the other beams of the connected beams being connected to said bracket.

6. The load-sensing element as defined in claim 5, wherein said bracket defines a recess which extends beneath the center beam, the depth of said recess being sufficient that it serves as an overload stop for the center beam.

7. The load-sensing element as defined in claim 5, further comprising:

a plate disposed on said center beam at a given distance from the top thereof which laterally overlaps the outer beams, said plate forming a stop plate serving as an overload stop.

* * * * *